United States Patent

Noniewicz et al.

[11] Patent Number: 6,095,319
[45] Date of Patent: Aug. 1, 2000

[54] BEARING STAND

[75] Inventors: Zbiegniew Noniewicz, Kempenich; Winfried Ebert, Weibern; Hans-Juergen Schueller, Koenigsfeld, all of Germany

[73] Assignee: Wolfcraft GmbH, Kempenich, Germany

[21] Appl. No.: 09/236,515

[22] Filed: Jan. 25, 1999

[30] Foreign Application Priority Data

May 11, 1998 [DE] Germany .................. 298 08 490 U

[51] Int. Cl.[7] .................................................. B65G 21/10
[52] U.S. Cl. .............................. 198/632; 198/861.1
[58] Field of Search ........................... 198/860.1, 861.1, 198/313, 581, 632; 193/35 TE; 108/116, 147.19, 147.2; 248/166, 439

[56] References Cited

U.S. PATENT DOCUMENTS

| | | | |
|---|---|---|---|
| 326,801 | 9/1885 | Sprague | 198/632 |
| 501,242 | 7/1893 | Buskin et al. | 198/581 X |
| 3,635,327 | 1/1972 | Thiessen | 198/861.1 |
| 4,715,488 | 12/1987 | Hewitt et al. | 198/861.1 X |
| 5,086,911 | 2/1992 | Douglas | 198/313 X |

*Primary Examiner*—James R. Bidwell
*Attorney, Agent, or Firm*—Hill & Simpson

[57] ABSTRACT

A combination adjustable height bearing stand and roller platform assembly is provided which can be fixed at a pre-adjusted height. The combination bearing stand and roller assembly includes two pairs of legs with each pair of legs being pivotally connected together at a joint connection so that the legs can be brought from a parallel position used for storage to an angled position. The corresponding legs of the two pairs of legs are connected by cross-connectors. The legs are tubular and one leg of each pair of legs receives a height-adjustable support which can be secured at a pre-selected height by a fixing element. The top ends of the height-adjustable support are connected to fastening elements which, in turn, are pivotally connected to two carriers which support the plurality of rollers of the roller platform assembly. Both the platform and bearing stand legs are pivotable between a collapsed and parallel storage position to an angled and horizontal position respectively using a single motion.

20 Claims, 6 Drawing Sheets

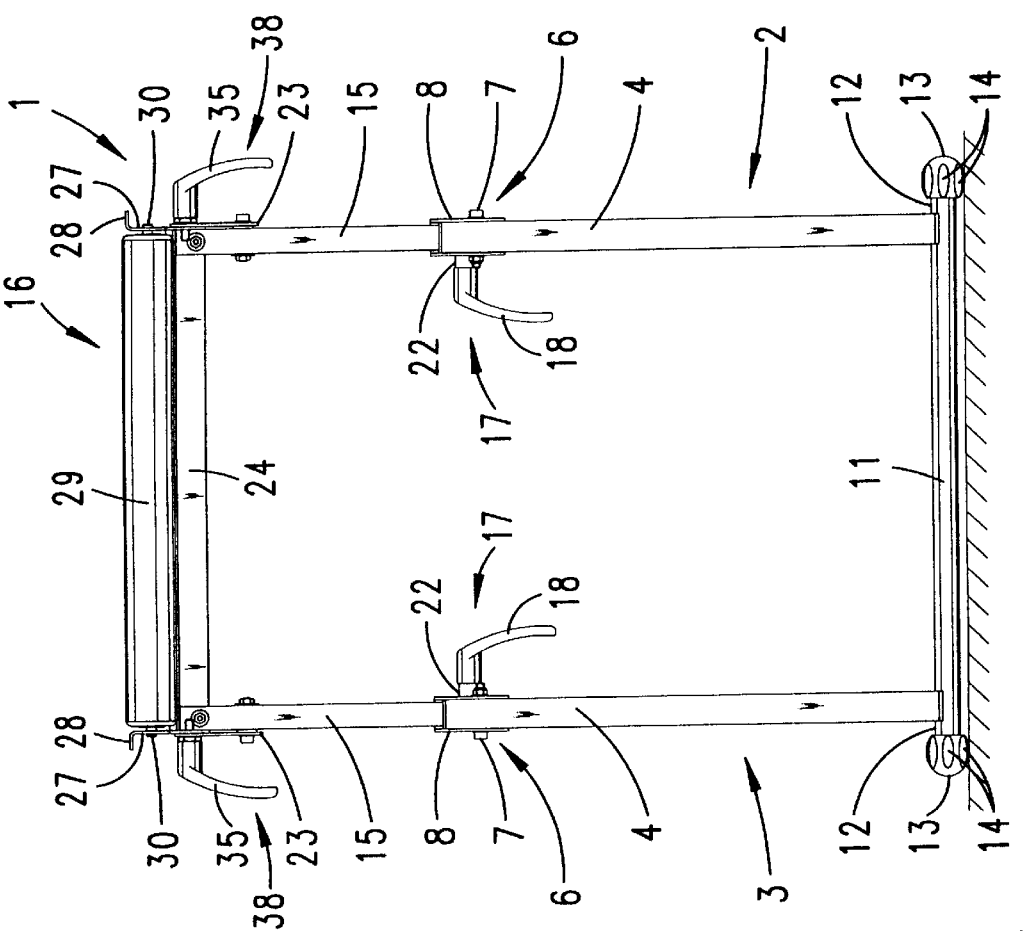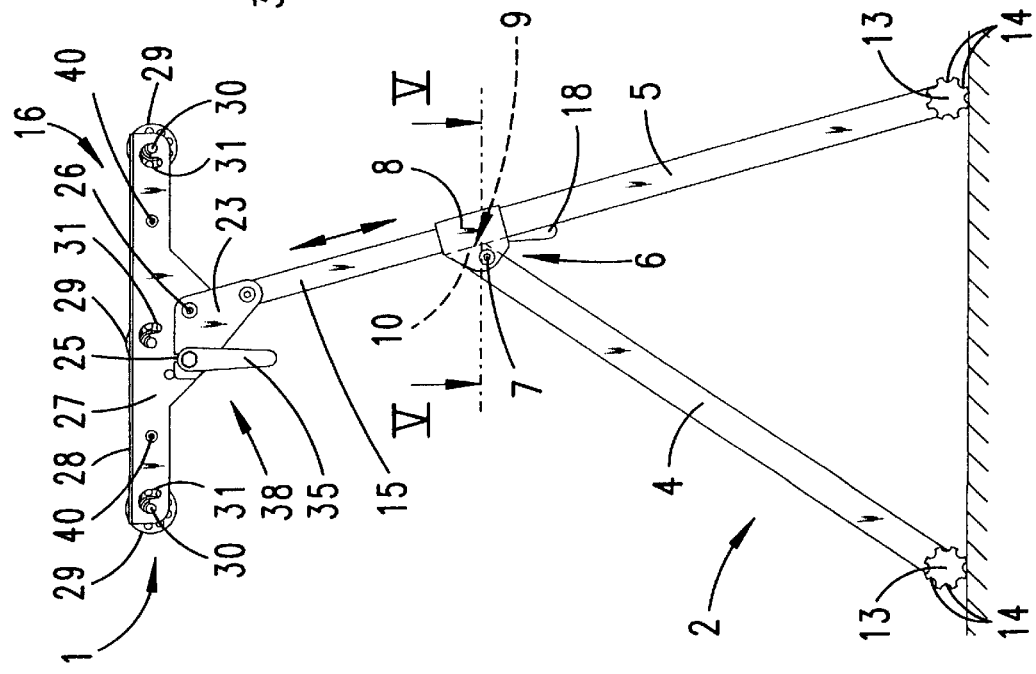

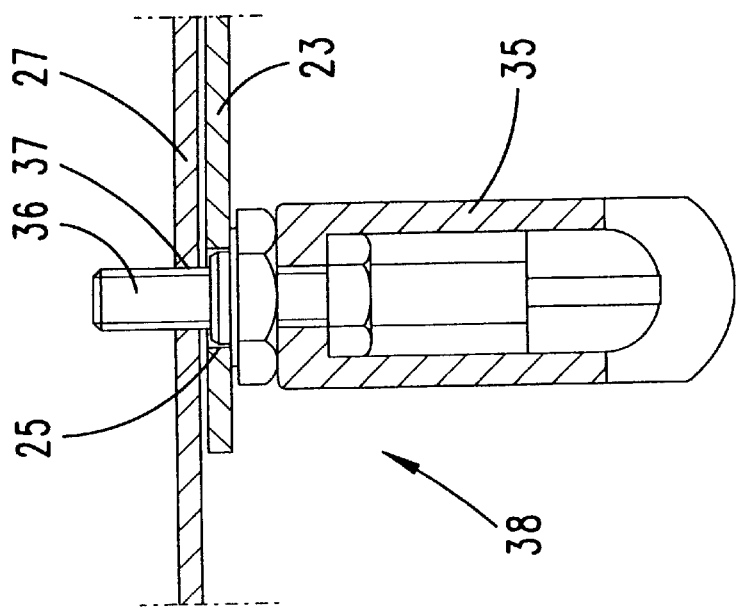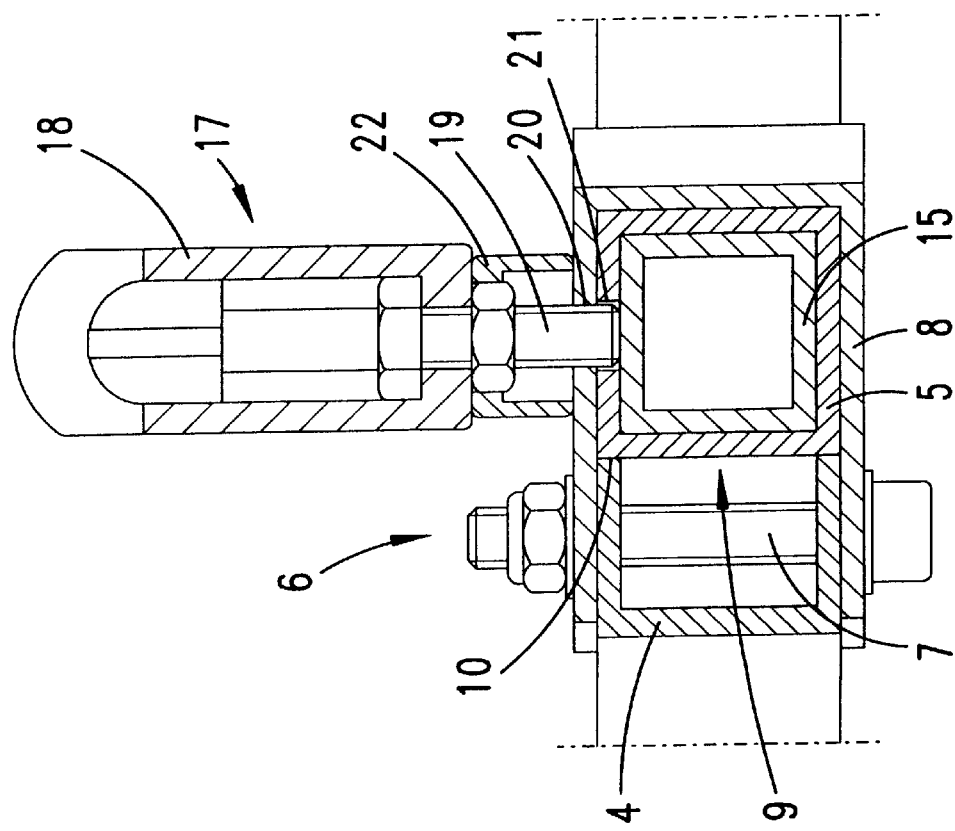

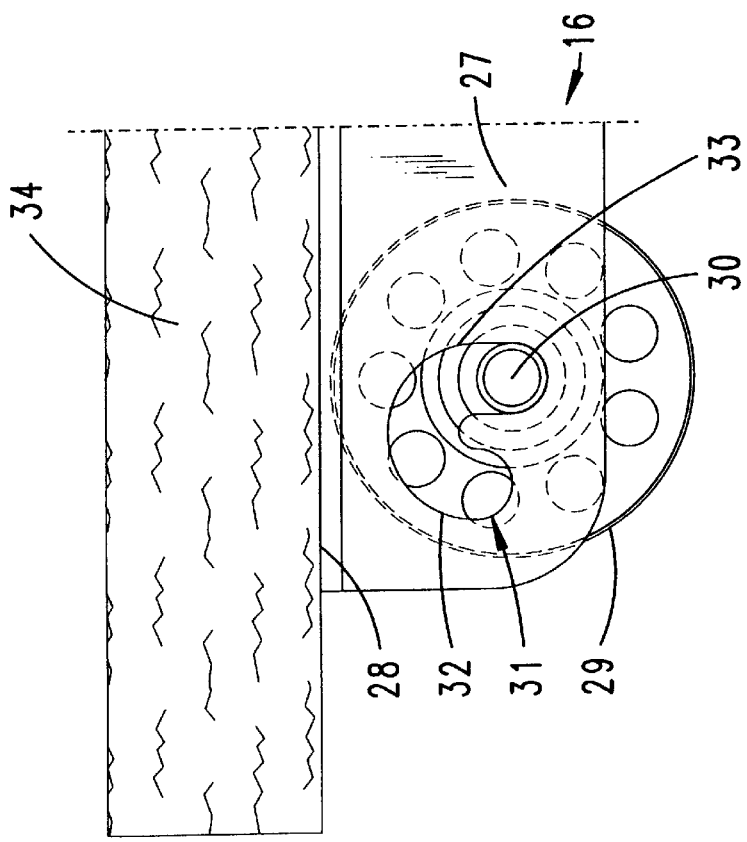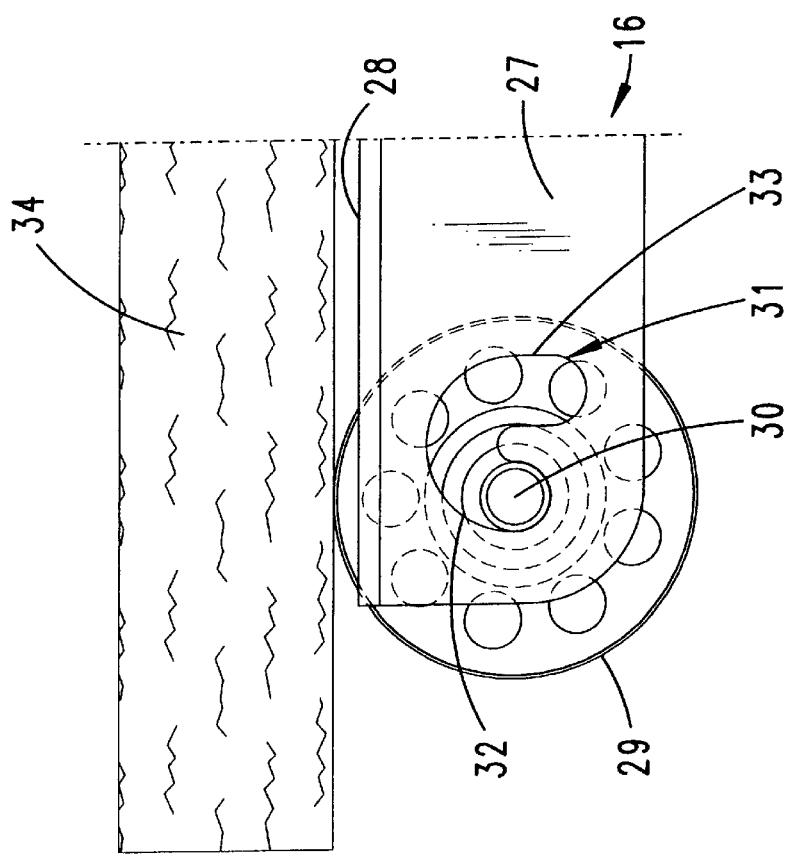

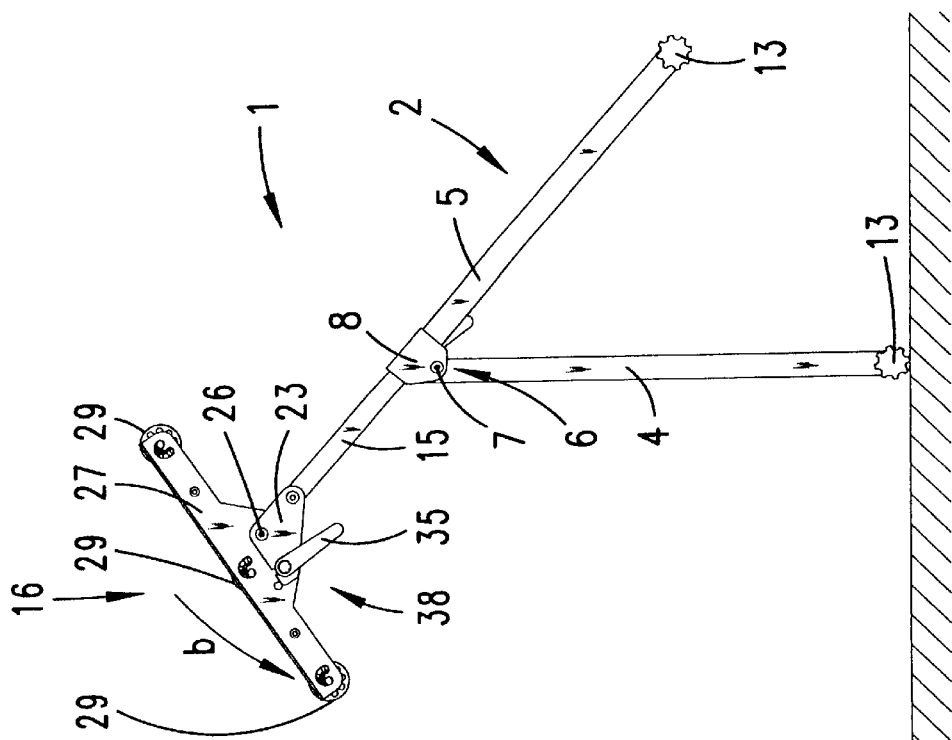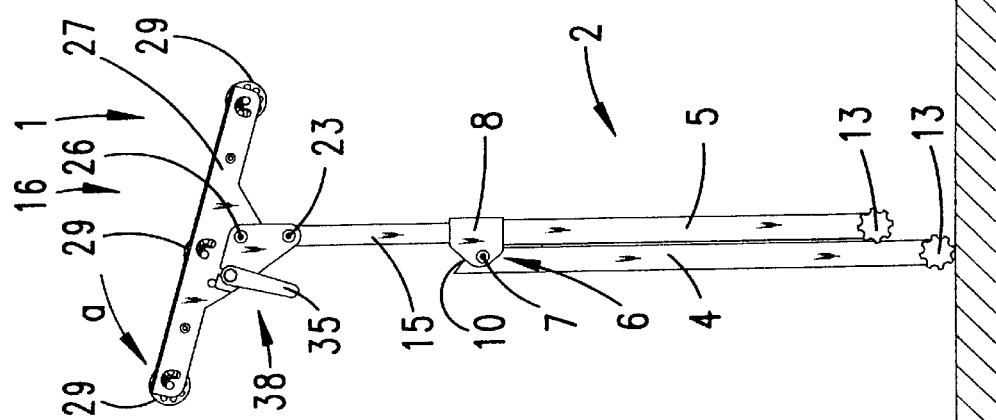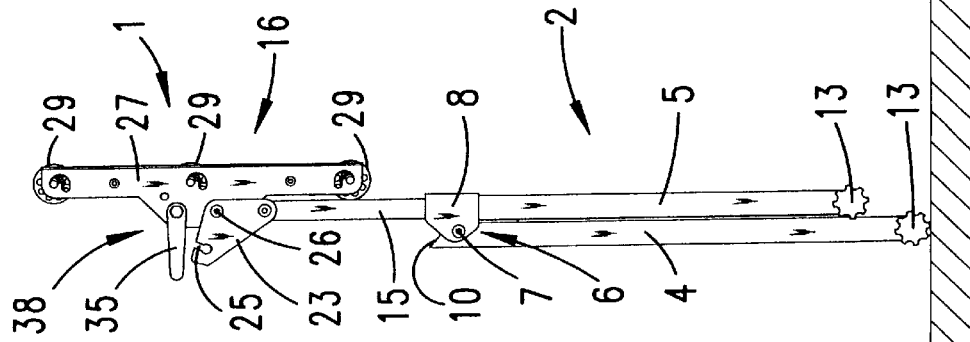

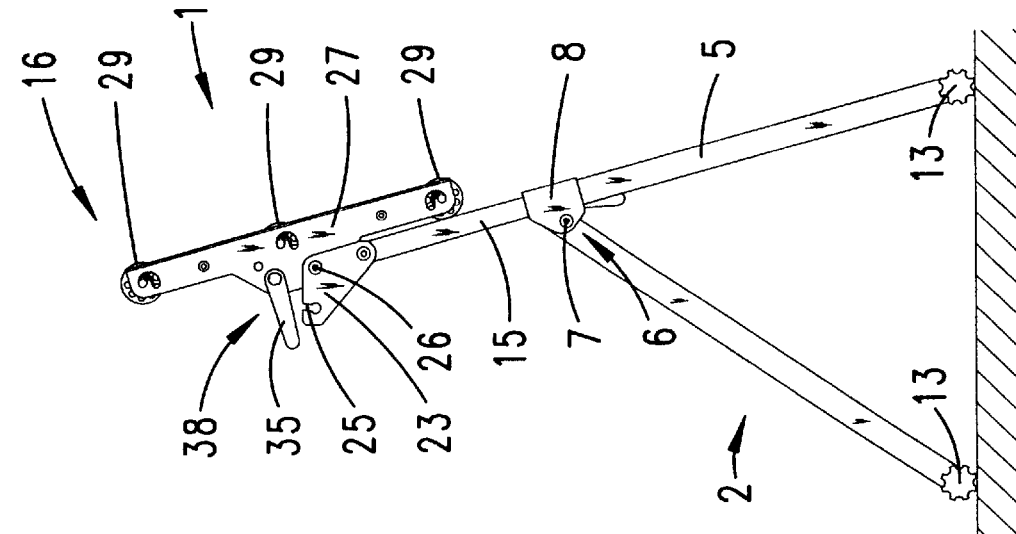
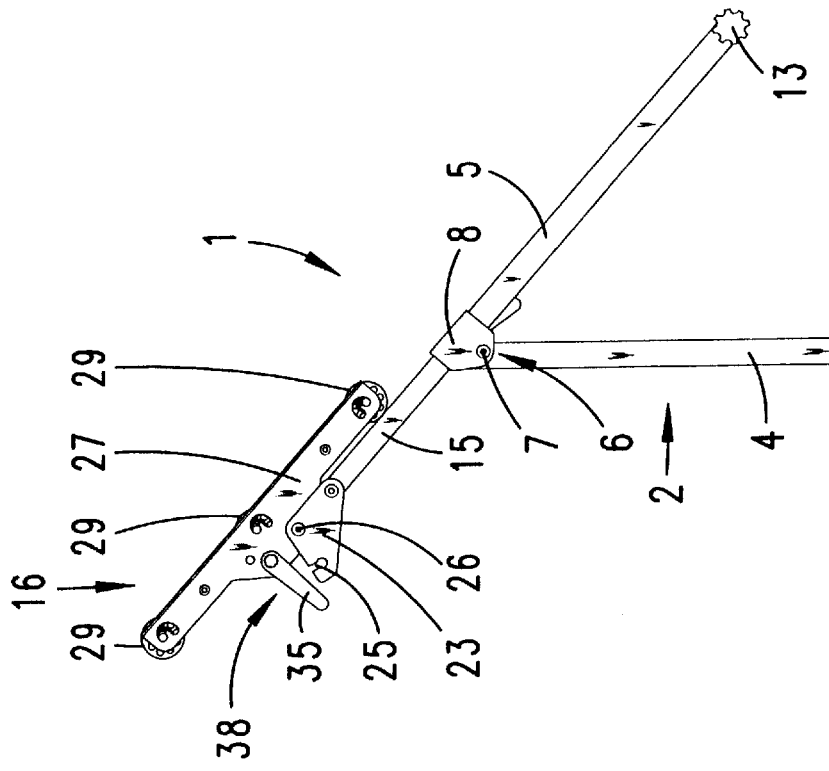

BEARING STAND

FIELD OF THE INVENTION

The present invention relates to a bearing stand for assemblies such as rollers which can be fixed at a preadjusted height. More specifically, the present invention relates to a bearing stand with two pairs of legs, each pair comprising two legs which are connected at a joint and which can be brought from a parallel position into an angled position.

BACKGROUND OF THE INVENTION

Bearing stands are known in widely varying embodiments and serve as support for lengthening the supporting surface of saw tables or workbenches. To this end, the assembly, which can be fastened at an adjustable height, can comprise a roller in order to enable an easy displacement of the supported work piece. It is also known to fold together such a bearing stand so as to save space, as needed, to which end the legs, which are connected at joints, are brought from an angled position into a parallel position. The supports bearing the assembly penetrate the joint of each pair of legs, halving the angle between the allocated legs, given a perpendicular orientation of each support.

With respect to the abovementioned prior art, it is considered a technical problem to improve the handling of a bearing stand of the type in question, particularly with respect to the handling in the course of the setup, or respectively, the collapsing.

SUMMARY OF THE INVENTION

This problem is initially and essentially solved by a combination adjustable height bearing stand and roller platform assembly that comprises two pair of legs, each pair of legs comprising a shorter leg and a longer leg. The shorter leg and longer leg of each pair of legs being pivotally linked together at a joint connection for pivotal movement with respect to one another between a parallel position and an angled position. Each shorter leg being hollow and matably receiving a height-adjustable support. Each height-adjustable support being secured in place by a fixing element disposed at the joint connection. Each height-adjustable support further comprising a distal end connected to a fastening element. Each fastening element being connected to and supporting a platform assembly.

In an embodiment, each fastening element is connected to an elongated carrier. The elongated carriers being disposed parallel to one another with at least one roller extending between the elongated carriers.

The elongated carriers each comprising a L-shaped cross-section and further comprising a support section disposed parallel to the at least one roller.

In an embodiment, each carrier is pivotally connected to its respective fastening element. Each carrier also being connected to a spindle. The carriers being pivotable between a storage position where the carriers are disposed parallel to the supports and a horizontal position where each spindle engages its respective fastening element.

In an embodiment, movement of the carriers from the storage position to the horizontal position is in the same direction as movement of the shorter legs from the parallel position to the angled position.

In an embodiment, the shorter legs are connected by a first cross-connector and the longer legs are connected by a second cross-connector.

In an embodiment, at least two rollers are provided and the rollers are adjustably connected to each carrier so that the height of each roller can be adjusted when the carriers are in the horizontal position.

In an embodiment, each roller comprises two axial extensions and each carrier comprises at least two inverted U-shaped bearing slits, each inverted U-shaped bearing slit accommodating one of the axial extensions of one of the rollers. Each inverted U-shaped bearing slit further comprising two leg sections having different lengths so that moving the axial extension accommodated therein from one leg section to the other leg section changes the height of the respective roller when the carriers are in the horizontal position.

In an embodiment, each carrier comprises an angle plate.

In an embodiment, the carriers each comprise an upper horizontal edge and each roller can be displaced from a lower position where the roller is disposed beneath the upper horizontal edge to a higher position where at least a portion of the roller projects vertically above the upper edge of each carrier when the carriers are in a horizontal position.

In an embodiment, each shorter leg comprises a lower free end and each longer leg comprises a lower free end. The first and second cross-connectors connecting the lower free ends of the shorter legs and longer legs respectively.

In an embodiment, the first and second cross-connectors each comprise opposing extensions which extend laterally beyond the lower free ends of the shorter and longer legs respectively. Each extension being connected to a standing cap.

In an embodiment, the standing caps comprise a plurality of radially extending ribs for enhancing traction.

In an embodiment, the spindles are connected to a handle.

In an embodiment, each carrier comprises a slit for accommodating its respective spindle when the carriers are moved to a horizontal position.

In an embodiment, the spindles are threaded and the handles are threadably connected to the spindles so that the handles may be tightened against the carrier when the carriers are moved to a horizontal position to secure the carriers in said horizontal position.

In an embodiment, the longer legs and shorter legs are tubular.

In an embodiment, the top ends of the longer and shorter legs are joined together at the joint connection by a U-shaped junction plate that comprises two opposing distal ends. The U-shaped junction plates wrap around the top end of one of the shorter legs with the top end of the longer leg of the pair of legs being disposed between the distal ends of the U-shaped junction plate. The distal ends of the U-shaped junction plate and the top end of the longer leg disposed therebetween are pivotally connected together by a hinge bolt.

The two legs of each pair do not have the same length, and the support inserts displaceably mounted in the shorter leg. The handling is facilitated by this design, particularly in the setup of the bearing stand. In addition, the bearing stand is thereby collapsible into the parallel position so as to save space, since, due to the supports which are inserted into the shorter legs.

The shorter legs do not contribute to the depth of the bearing stand in the collapsed position. Rather, the supports form an extension of the shorter legs which project beyond the joint and, together with the terminally arranged assembly, offer a handle for setting up the bearing stand. To this end, the bearing stand is grasped in the folded position in the region of the assembly or of the supports. A swivelling of the shorter legs subsequently occurs from the longer legs, which support the bearing stand on the ground, into the service position, which is preferably limited by a stop and is fixable. The supports form a lever for a shear-like opening of the pair of legs. The setup of the bearing stand into the service position can thus be performed by the user most easily in the upright position.

In a preferred development of the invention it is provided that the assembly forms carriers which are linked to the fastening elements in swivelling fashion. In the framework of this development, also, the assembly can be brought from the service position into a space-efficient position with collapsed leg pairs. The design is preferably selected such that, to set up the bearing stand into the service position, the swivelled assembly is grasped, and by means of pulling at said assembly, not only the assembly but also the pairs of legs are guided into the service position. To this end, it is provided that the carriers form a flat support with which the inventive bearing stand can be used as a support in typical fashion.

In addition, from a position which is parallel to the supports, the carriers can preferably be swivelled against a stop into a horizontal position. The parallel position of the carriers with respect to the supports contributes to the desired saving of space in the collapsed position. By the swivelling up into the horizontal position, a support plane is formed which is favorable for service and which, due to the adjustability of the height of the supports, can be adapted, for example, to an allocated saw table or workbench. It is inventively provided that the swivel direction of the carriers into the horizontal position is the same as the swivel direction of the legs into the angled position, thereby achieving the desired facilitation of the handling in the course of setting up the bearing stand.

In a preferred embodiment, it is provided that the opposed carriers bear at least one roller. By means of the latter, the supported work piece can be more easily displaced for processing at a saw table or a workbench, for example, and can thus be better conveyed to the point of processing. In order to also use the inventive bearing stand as a conventional support in which the easy displacement of the work piece is not desirable, it is provided that the height of the rollers is adjustable. On the basis of this design, the rollers are displaceable from a support position for the work piece into a lowered position. In this regard, it is also provided that the axial projections of the rollers sit in U-shaped bearing slits with U-legs of different lengths. This design provides the inventive adjustability of the height of the rollers most easily.

Because there is a plurality of rollers, there is individual use, whereby the height of each roller can be separately adjusted at its ends. The rollers can thus be brought into the height-displaced position with their axial extensions only at one end. If the height-adjusted side is alternated in a plurality of rollers, then a valley emerges in the displacement direction of the work piece, which is particularly advantageous given work pieces with an annular cross-section.

In further developments of the inventive subject matter, it is provided that the carrier is an angle plate. Beyond this, it has proven advantageous if the rollers are displaceable from a first position lying beneath the upper side of the carrier into a second position in which only the apex region of the rollers projects beyond the upper side of the carrier. To stabilize the bearing stand, it is provided that the connecting elements between the legs and the supports are respectively arranged at the free ends. This results in a region which is free of cross-struts between the foot regions of the legs and the end regions, allocated to the carriers, of the supports.

Furthermore, it is provided that the cross-connectors which connect the legs to each other form extensions on which bearing caps rest. The bearing caps are preferably profiled by ribs which extend in the axial direction, providing an increased stability under load. The profiled design of the bearing caps provides an anti-sliding device not only in the course of the setup of the stand but also during use.

To lock the selected assembly height, it is provided that the fixing means is formed by a threaded spindle which is provided with a handle and which acts non-positively on the ends of the supports, preferably in the region of the joint of the leg pairs. In addition, the horizontal position of the carriers can also be locked in that the stop is a threaded spindle which is provided with a handle and which dips into a slit opening.

A slit opening which is formed in a supporting plate at the terminal side of the supports is preferably allocated to each carrier. Subsequent to a swivelling of the carrier into the horizontal position, the threaded spindles lie in the respective slit openings. A nonpositive fixing of the horizontal position can be subsequently achieved by tightening this threaded spindle.

In a further preferred embodiment, it is provided that the legs and the supports are constructed from tubular profiles. Furthermore, these tubular profiles are preferably constructed with a square cross-section. Finally, it is advantageous if the legs are fixed in the angled position only by the contact of an obliquely extending face of the longer leg at the shorter leg, and they are otherwise connected to each other without coupling bars.

Other objects and advantages of the invention will become apparent upon reading the following detailed description and appended claims, and upon reference to the accompanying drawings.

BRIEF DESCRIPTION OF THE DRAWINGS

The invention is detailed below with the aid of the enclosed drawing, which merely depicts an exemplifying embodiment. In the drawing:

FIG. 1 illustrates an inventive bearing stand in a lateral view related to the collapsed service position;

FIG. 2 is a front view of the bearing stand;

FIG. 5 is a sectional view along the line V—V in FIG. 1;

FIG. 6 is a sectional view along the line VI—VI in FIG. 4;

FIG. 7 is a sectional enlargement according to the region VII in FIG. 4;

FIG. 8 is an illustration corresponding to FIG. 7, but after the lowering of the rollers of the assembly;

FIG. 9 is a lateral view of the bearing stand in the collapsed non-service position;

FIG. 10 is an illustration continuing from FIG. 9 in the course of the setup of the bearing stand, given a support assembly which has been swivelled up;

FIG. 11 is another continuing illustration, depicting the bearing stand in the course of the upward swivelling of the pairs of legs;

FIG. 12 is an illustration continuing from FIG. 9, in another setup variation in which the pairs of legs have first been swivelled up; and FIG. 13 is an illustration continuing from FIG. 12.

Figure 4:
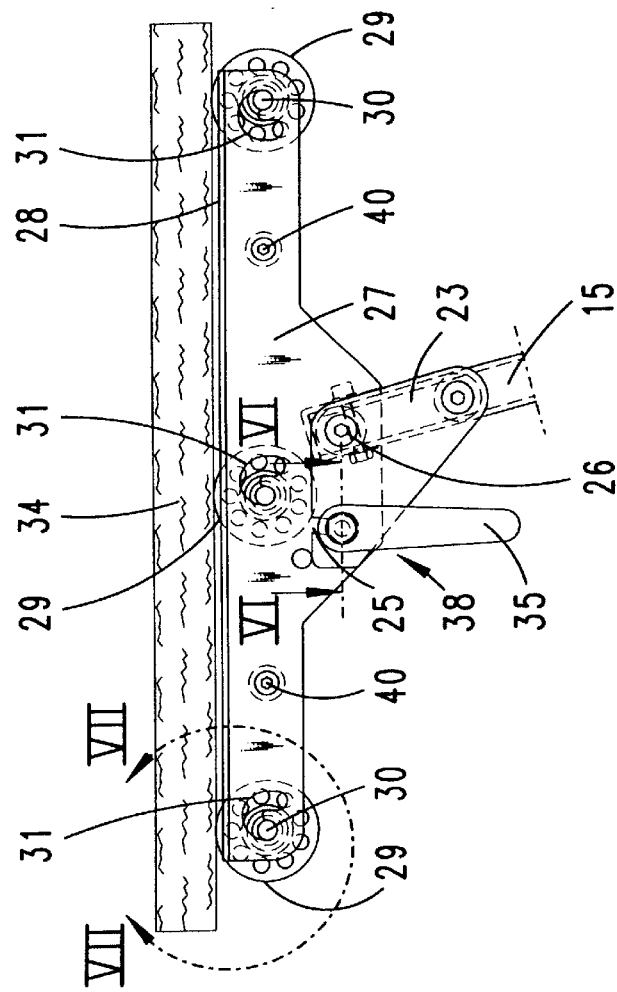
FIG. 4 is an enlarged view of FIG. 1, depicting an assembly which comprises rollers, with a supported work piece.
Figure 3:
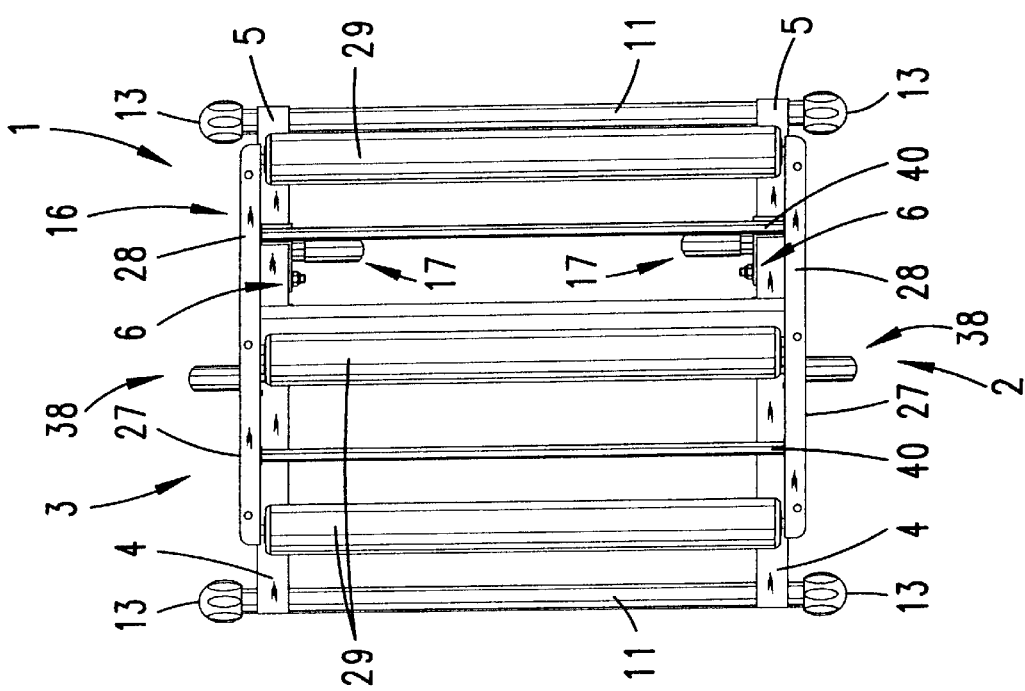
FIG. 3 is a top plan view of the bearing stand.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

With reference to FIGS. 1 and 2, a bearing stand 1 which comprises two pairs of legs 2, 3 is initially illustrated and described, a leg 4 of each leg pair 2, 3 being constructed longer than the other leg 5.

The legs 4 and 5 of each pair 2, 3 are linked via a joint 6. The latter is formed by a hinge bolt 7, which penetrates the leg 4 near the end which faces the leg 5, said bolt being mounted in a junction plate 8 with a U-shaped cross-section. The junction plate 8 surrounds the free end of the shorter leg 5 and is connected thereto by welding, for example. The freely projecting regions of the U-legs of the junction plate 8 accept the free end of the leg 4 between them. The hinge bolt 7 thus penetrates not only the U-legs of the junction plate 8 but also the free end regions of the legs 4.

The angled position of the legs 4 and 5 according to FIG. 1 is limited by a stop 9, which is formed by an obliquely extending face 10 of the longer leg 4. The face 10 of the longer leg 4 engages the shorter leg 5 in the angled position shown in FIG. 1.

In the region of the free ends, the mutually corresponding legs 4, or respectively, 5 of the two pairs 2 and 3 are connected by cross-connectors 11, which form extensions 12, which project out beyond the legs and on which bearing caps 13 rest.

To increase the stability bearing stand 1 under load, the bearing caps 13 are profiled by ribs 14, which extend in the axial direction of the cross-connectors 11, and are preferably produced from plastic.

The legs 4, 5 and the cross-connectors 11 are formed by tubular profiles. The legs 4, 5 are constructed with a square cross-section and the cross-connectors 11 being constructed with an annular cross-section.

The thusly formed chassis of the bearing stand 1 bears an assembly 16 via supports 15 having an adjustable height. The supports 15 are likewise formed from tubular profiles with a square cross-section and insert displaceably into the shorter leg 5, thus simultaneously penetrating the region of the junction plate 8.

Each support 15 is fitted with its outer cross-section to the inner cross-section of the legs 5 and is thus guided telescopically into said inner cross-section. The selected assembly height can be locked with the aid of fixing means 17. Each fixing means 17 is formed by a threaded spindle 19 provided with a handle 18. Said spindle inserts into a threaded borehole 20 constructed in the junction sheet 8 and penetrates a correspondingly positioned borehole 21 of the shorter leg 5.

The locking occurs by the threaded spindle 19 striking, at the face, a lateral face of the support 15 in the course of the tightening of the threaded spindle 19 by rotation of the handle 18, the handle 18 being supported against the outer surface of the junction plate 8 via a distance sleeve 22. The support 15 is thus held non-positively in the leg 5 (cf. FIG. 5).

At their upper free ends, the supports 15 are provided with fastening elements 23 which are constructed as triangular plates. Furthermore, the two free ends of the supports 15 are connected by a cross-connector 24 formed by a tubular profile with a square crosssection. Together with the legs 5 and its cross-connectors 11, a frame is formed.

Conditioned by their triangular shape, the fastening elements 23 project from the supports 15 in the direction of the longer legs 4 and have slit openings 25 in the protruding regions. The openings 25 being open from above.

The free end region of the supports 15 and the triangular plates 23 are penetrated by link pins 26 for the slewable mounting of the assembly 16 at the supports 15.

This assembly 16 is positioned between the end regions of the supports 15 and forms carriers 27 via which the assembly 16 is linked to the fastening elements 23.

The carriers 27 are constructed as angle plates and extend parallel to the pairs of legs 2, 3. The length of the carrier 27 is selected such that, in the service position of the bearing stand 1 according to FIG. 1, the assembly 16 is disposed vertically the spread of the legs 4, 5. This configuration results in a good stability under load.

Approximately in the middle of their longitudinal reach, the carriers 27 are penetrated by the axial bolts 26 for secure holding. Due to the construction of the carriers 27 as angle plates, they form a flat support 28 with their shorter sides, which are perpendicular to those penetrated by the axial bolts 26.

In addition, three evenly spaced rollers 29 bear the opposed carriers 27, two rollers 29 being allocated to the freely protruding terminal regions of the carriers 27, and one roller 29 being allocated to the center region of the carriers 27.

The height of these rollers 29 is adjustable. To this end, axial extensions 30 of the rollers 29 rest in U-shaped bearing slits 31 of the carriers 27. The latter comprise U-legs 32, 33 of different lengths. If an axial extension 30 of a roller 29 is accordingly inserted into the shorter leg 32, the upper position of the appertaining roller 29 is thus achieved, only the crown region of the roller 29 projecting beyond the upper side of the carriers, which is formed by the supporting surface 28. A supported work piece 34 can be thereby easily displaced on the rollers 29 essentially parallel to the longitudinal extent of the carriers 27.

If, on the other hand, the axial extension 30 is moved into the longer U-legs 33 of the bearing slit 31, then this effects a lowering of the appertaining rollers 29 into a position beneath the upper side of the carriers, as in FIG. 8. A work piece 34 is thereby placed onto the supporting surface 28.

In addition, the height of the three rollers 29 can be separately adjusted. It is also possible to displace the height of each roller 29 on one side only, which effects an inclination of the relevant rollers 29 relative to the horizontals. If the rollers 29 are raised at one side or the other in alternation, then a valley-type guide mechanism arises in the direction of the displacement of the work piece, which is particularly advantageous given tubular work pieces.

The assembly is stabilized by two crossbars 40 connecting the carriers 27 between the rollers 29, the position and diameter of said crossbars being selected such that they are always situated beneath the crown region of the rollers 29, regardless of the height position of said rolls.

As previously mentioned, the whole assembly 16 is securely mounted at the supports 15, the service position according to FIG. 1 being fixable. To this end, the carriers 27 encounter a stop in the horizontal position. This is formed on all sides of the carriers by a threaded spindle 36 provided with a handle 35. The handle 35 dips into the previously mentioned slit opening 25 of the allocated fastening element 23. The threaded spindles 36 are turned in threaded boreholes 37 of the sides of the carriers 27, which are likewise penetrated by the axle bolts 26. By the swiveling of the assembly 16 into the horizontal position, the threaded spindles 36 insert into the slit openings 25, subsequent to which, due to the rotation of the handles 35, said handles encounter the allocated triangular plate 23, and due to further tightening, said plate braces against the adjacent carriers 27 at the inner wall. The ends of the slits of the slit openings 25 serve as stop limits.

FIG. 9 depicts the collapsed position of the bearing stand 1. It can be seen that the legs 4 and 5 of each pair 2, 3 can be oriented in a parallel position by the loosening of the fixing means 17 and of the locking means 38 for the assembly 16, and that, furthermore, the carriers 27 of the assembly 16 also extend parallel to the supports 15. When collapsed into the non-service position, the bearing stand 1 merely stands on the standing caps 13 of the longer legs 4.

From this inactive position, a folding of the bearing stand 1 is possible in two ways. For one, a swivelling of the freely projecting end of the assembly 16 into the service position is possible by means of the grasping of the end of the assembly as shown in FIG. 10. From this position, depicted in FIG. 10, the folding of the leg pairs 2, 3 can occur by further striking of said free end region of the assembly as shown in FIG. 11, and, conditional to the swivel direction (arrow a) of the assembly 16, or respectively, of the carriers 27 into the horizontal position being the same as the swivel direction (arrow b) of the legs into the angled position. The profiled standing caps 13 of the longer legs 4, which brace against the ground, therein prevent a sliding of the bearing stand 1. This results in a convenient folding of the bearing stand 1 in the standing position of the user, given only one continuous movement.

Alternatively, the folding can also occur as shown in FIGS. 12 and 13, whereby, proceeding from FIG. 9, the legs can be brought into their angled position—potentially by slight forward spreading by means of foot pressure against the cross-connector 11 of the shorter legs 5—by a grasping of the upper cross-connector 24, which connects the supports 15 to one another, and by subsequent swivelling displacement. If this position is achieved, the bearing stand 1 is set on the ground, as depicted in FIG. 13. Finally, the assembly 16 is swivelled into the horizontal service position and locked.

All the features disclosed are essential to the invention. The disclosure contents of the relatively priority documents and copy of the prior application are also hereby incorporated in their entirety into the disclosure of the application for the purpose of incorporating features of these documents in claims of the present application.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

We claim:

1. A combination adjustable height bearing stand and platform assembly, the combination bearing stand and platform assembly comprising:

two pairs of legs, each pair of legs comprising a shorter leg and a longer leg, the shorter leg and longer leg of each pair legs being pivotally linked together at a joint connection for pivotal movement with respect to one another between a parallel position into an angled position, each shorter leg being hollow and matably receiving a height-adjustable support, each height-adjustable support being secured in place by a fixing element disposed at the joint connection, each height-adjustable support comprising a distal end connected to a fastening element, each fastening element being connected to and supporting a platform assembly.

2. The combination bearing stand and platform assembly of claim 1 wherein each fastening element is connected to an elongated carrier, the elongated carriers being disposed parallel to one another with at least one roller extending between the elongated carriers.

3. The combination bearing stand and platform assembly of claim 2 wherein the elongated carriers each comprise an L-shaped cross-section and further comprise a support section disposed parallel to the at least one roller.

4. The combination bearing stand and platform assembly of claim 1 wherein each carrier is pivotally connected to its respective fastening element, each carrier also being connected to a spindle, the carriers being pivotable between a storage position where the carriers are disposed parallel to the supports and a horizontal position wherein each spindle engages its respective fastening element.

5. The combination bearing stand and platform assembly of claim 1 wherein each carrier is pivotally connected to its respective fastening element, each carrier being connected to a spindle, the carriers being pivotable between a storage position where the carriers are disposed parallel to the supports and a horizontal position wherein each spindle engages its respective fastening element, and movement of the carriers from the storage position to the horizontal position being in the same direction as movement of the shorter legs from the parallel position to the angled position.

6. The combination bearing stand and platform assembly of claim 1 wherein the shorter legs are connected by a first cross-connector, the longer legs are connected by a second cross-connector.

7. The combination bearing stand and platform assembly of claim 1 wherein further comprising at least two rollers extending between the carriers, and the rollers are adjustably connected to each carrier so that a height of each roller is adjustable when the carriers are in the horizontal position.

8. The combination bearing stand and platform assembly of claim 7 wherein each roller comprises two opposing axial extensions and each carrier comprises at least two inverted U-shaped bearing slits, each inverted U-shaped bearing slit accommodating one of the axial extensions of one of the rollers, each inverted U-shaped bearing slit comprising two leg sections having different lengths so that moving the axial extension accommodated therein from one leg section to the other leg section changes the height of the respective roller when the carriers are in the horizontal position.

9. The combination bearing stand and platform assembly of claim 1 wherein each carrier comprises an angle plate.

10. The combination bearing stand and platform assembly of claim 8 wherein the carriers each comprise an upper horizontal edge and each roller can be displaced from a lower position wherein said roller is disposed beneath the upper horizontal edge of each carrier to a higher position wherein at least a portion of said roller projects vertically above the upper edge of each carrier when the carriers are in the horizontal position.

11. The combination bearing stand and platform assembly of claim 6 wherein each shorter leg comprises a lower free end and each longer leg comprises a lower free end, the first cross-connector connecting the lower free ends of the shorter legs, the second cross-connector connecting the lower free ends of the longer legs.

12. The combination bearing stand and platform assembly of claim 11 wherein the first and second cross-connectors each comprise opposing extensions which extend laterally outward beyond the lower free ends of the shorter and longer legs respectively, each extension being connected to a standing cap.

13. The combination bearing stand and platform assembly of claim 12 wherein the standing caps comprises a plurality of radially extending ribs for enhancing traction.

14. The combination bearing stand and platform assembly of claim 4 wherein the spindles are each connected to a handle.

15. The combination bearing stand and platform assembly of claim 4 wherein each carrier comprises a slit for accommodating its respective spindle when the carriers are moved to the horizontal position.

16. The combination bearing stand and platform assembly of claim 14 wherein each carrier comprises a slit for accommodating its respective spindle when the carriers are moved to the horizontal position.

17. The combination bearing stand and platform assembly of claim 1 wherein the longer legs and shorter legs are tubular.

18. The combination bearing stand and platform assembly of claim 1 wherein each shorter leg comprises a top end and each longer leg comprises a top end, the top end of each shorter leg being connected to the top end of its respective longer leg at the joint connection by a U-shaped junction plate comprising two opposing distal ends, each U-shaped junction plate wrapping around the top end of one of the shorter legs with the top end of the longer leg of the pair of legs being disposed between the distal ends of the U-shaped junction plate, the distal ends of the U-shaped junction plate and the top end of its respective longer leg being pivotally connected together by a hinge bolt.

19. A combination adjustable height bearing stand and roller platform assembly, the combination bearing stand and platform assembly comprising:

two pairs of legs, each pair of legs comprising a shorter leg and a longer leg, each shorter leg comprising a top end and each longer leg comprising a top end, the top end of each shorter leg being connected to the top end of its respective longer leg by a U-shaped junction plate comprising two opposing distal ends, each U-shaped junction plate wrapping around the top end of one of the shorter legs with the top end of the longer leg of the pair of legs being disposed between the distal ends of the U-shaped junction plate, the distal ends of the U-shaped junction plate and the top end of its respective longer leg being pivotally connected together by a hinge bolt, each pair of legs being pivotally moveable with respect to one another between a parallel position into an angled position, each shorter leg being hollow and the top end of each shorter leg matably receiving a height-adjustable support, each height-adjustable support being secured in place by a fixing element disposed at the joint connection, each height-adjustable support comprising a distal end connected to a fastening element, each fastening element being connected to and supporting an elongated carrier, the elongated carriers being disposed parallel to one another with at least one roller extending between the elongated carriers, each carrier is pivotally connected to its respective fastening element, each carrier being connected to a spindle, the carriers being pivotable between a storage position where the carriers are disposed parallel to the supports and a horizontal position wherein each spindle engages its respective fastening element.

20. A combination adjustable height bearing stand and roller platform assembly, the combination bearing stand and platform assembly comprising:

two pairs of legs, each pair of legs comprising a shorter leg and a longer leg, each shorter leg comprising a top end and each longer leg comprising a top end, the top end of each shorter leg being connected to the top end of its respective longer leg by a U-shaped junction plate comprising two opposing distal ends, each U-shaped junction plate wrapping around the top end of one of the shorter legs with the top end of the longer leg of the pair of legs being disposed between the distal ends of the U-shaped junction plate, the distal ends of the U-shaped junction plate and the top end of its respective longer leg being pivotally connected together by a hinge bolt, each pair of legs being pivotally moveable with respect to one another between a parallel position into an angled position, each shorter leg being hollow and the top end of each shorter leg matably receiving a height-adjustable support, each height-adjustable support being secured in place by a fixing element disposed at the joint connection, each height-adjustable support comprising a distal end connected to a fastening element, each fastening element being connected to and supporting an elongated carrier, the elongated carriers being disposed parallel to one another with at least one roller extending between the elongated carriers, each carrier is pivotally connected to its respective fastening element, each carrier being connected to a spindle, the carriers being pivotable between a storage position where the carriers are disposed parallel to the supports and a horizontal position wherein each spindle engages its respective fastening element, each carrier comprising a slit for accommodating its respective spindle when the carriers are moved to the horizontal position whereby movement of the carriers from the parallel position to the horizontal position being in the same direction as movement of the shorter legs from the parallel position to the angled position, and each roller comprising two opposing axial extensions and each carrier comprising at least one inverted U-shaped bearing slit for accommodating one of the axial extensions of each roller, each inverted U-shaped bearing slit comprising two leg sections having different lengths so that moving the axial extension of one of rollers from one leg to the other leg changes the height of said roller when the carriers are in the horizontal position.

* * * * *